United States Patent [19]
Takatori et al.

[11] Patent Number: 5,257,342
[45] Date of Patent: Oct. 26, 1993

[54] LEARNING METHOD FOR A DATA PROCESSING SYSTEM WITH NEIGHBORHOODS

[75] Inventors: Sunao Takatori; Makoto Yamamoto, both of Tokyo, Japan

[73] Assignee: Yozan, Inc., Tokyo, Japan

[21] Appl. No.: 680,117

[22] Filed: Apr. 3, 1991

[30] Foreign Application Priority Data

Apr. 4, 1990 [JP] Japan .................................. 2-88163

[51] Int. Cl.⁵ .............................................. G06F 15/18
[52] U.S. Cl. .................................................... 395/23
[58] Field of Search ................................... 395/23, 24

[56] References Cited

U.S. PATENT DOCUMENTS 4,874,963  10/1989  Alspector .................................. 377/2
5,033,066   7/1991  Ishizuka et al. ....................... 395/24

OTHER PUBLICATIONS

Lampinen et al., Fast Self-Organization by the Probing Algorithm, Lappennranta University of Technology, Department of Information Technology, Box 20 Sf-53851 Lappeenranta, Finland.

Primary Examiner—Allen R. MacDonald
Attorney, Agent, or Firm—Cushman, Darby & Cushman

[57] ABSTRACT

A learning method for a neural network type data processing system determines activation patterns in an input layer and output layer arbitrarily, increases weights of synapses in a middle layer and the output layer so that neuron activate with more than a certain rate among those corresponding to neurons in the input layer and the output layer and repeats the same process for each neuron in the middle layer. The input layer and output layer possess a plurality of neurons which activate and output certain data according to a specific result and the middle layer is between the input layer and output layer. The middle layer also possesses a plurality of neurons which are connected to each neuron in the input layer and output layer.

6 Claims, 5 Drawing Sheets

LEARNING METHOD FOR A DATA PROCESSING SYSTEM WITH NEIGHBORHOODS

BACKGROUND OF THE INVENTION

1. Field of the Invention

The present invention is related to a data processing system based on the concept of a neural network.

2. Background Information

A neural network in a data processing system is constructed in a layer state by arranging neural cells in parallel, see model 1 in FIG. 3 ("neuron", hereinafter). The neuron in each layer combines by synapses with all the neurons in adjacent layers and inputs and outputs data. Concerning neuron 1, in FIG. 3, weights WI, W2, W3, ..., Wn are multiplied by data I1, I2, I3, ..., In inputted from outside, and data 0 is outputted corresponding to the comparison between the sum of the multiplication and threshold Θ.

Various methods are possible for the comparison. When normalized function 1[f]is adopted, output data 0 is expressed as formula (1).

$$0 = 1 [\Sigma Wn \cdot In - \Theta]$$

When ΣWn ·In is more than or equal to threshold when ΣWn ·In is less than threshold Θ, the neuron is not activated, and output data 0 is "0".

Conventional neural networks have neural layers with neurons arranged in parallel with the neural layers connected in series. Neural layers are comprised of, for example, 3 layers, namely, an input layer, a middle layer and an output layer, as Perceptrons suggested by Rosenblatt. The neuron in each layer combines with all neurons in adjacent other layers by synapses.

SUMMARY OF THE INVENTION

In such a data processing system, the operation to adapt the weight of synapse of each neuron is called "learning". However, problems exist, such as guaranteeing its realization and performing it efficiently. For example, in the back-propagation method, there are problems, such as getting out of local minimum and convergence time. This tendency is quite prevalent in neural networks including a lot of middle layers.

The present invention solves the abovementioned problems of the prior art and has an object to provide a learning method with the ability to execute efficient learning to the middle layer.

A learning method of the present invention works as illustrated below:

i) deciding activation patterns in an input layer and in an output layer arbitrarily concerning plural inputs and outputs;

ii) deciding that weights of synapses in a middle layer and output layer have the tendency of activation in a case that neurons activate with more than a certain rate among those in the middle layer corresponding to neurons in the input layer and the output layer and neurons adjacent to them in the middle layer.

In the case where there are a lot of middle layers, the middle layer is increased sequentially by adding a new middle layer when the learning in a middle layer is concluded on a certain step and executing the same learning to it. Here, the number of neurons in the input and the output layer is decided by data capacity of neurons in the whole neural network. Therefore, it is necessary to increase middle layers to process a lot of data.

PREFERRED EMBODIMENTS OF THE PRESENT INVENTION

Hereinafter, the present invention is explained with reference to the attached drawings.

Figure 1:
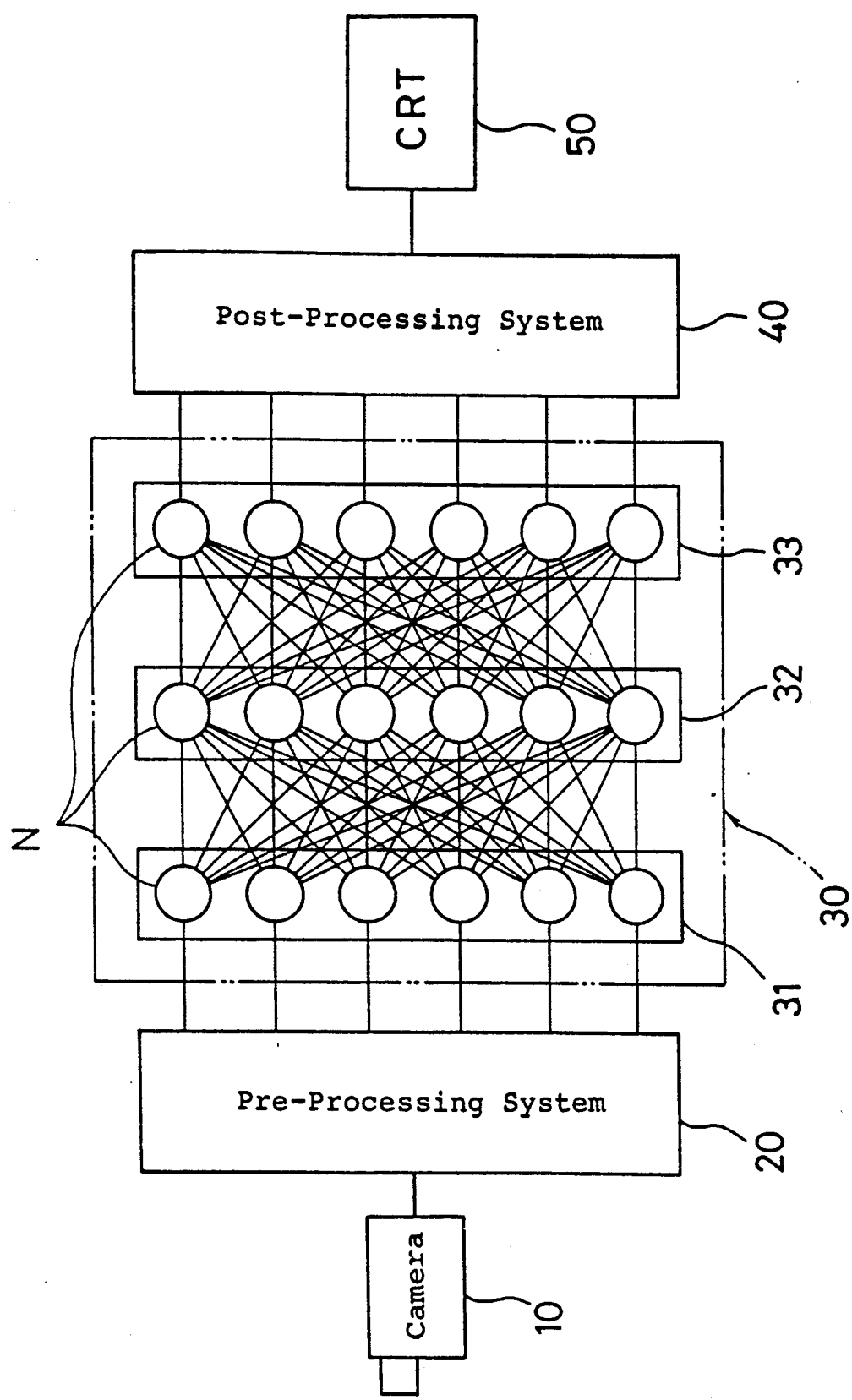
FIG. 1 shows an approximate structure of a character recognition system applied to the first embodiment of the present invention.

FIG. 1 shows a character recognition system comprising a data processing system according to the first embodiment. The character recognition system comprises video camera 10, preprocessing system 20, data processing system 30, post-processing system 40 and display 50. Video camera 10 is situated in order to input characters/letters and is connected to preprocessing system 20. Preprocessing system 20 is, for example, a well-known image processing system, which extracts the characteristics of an inputted character/letter (the number of edge points or branch points, for instance) and outputs the data to data processing system 30. Data processing system 30, having a neural network construction which will be described later, recognizes a character/letter based on the characteristics data inputted from preprocessing system 20, and outputs the data according to the recognition result to post-processing system 40. The recognition signal is character codes, for instance. Post-processing system 40 stores the output data as, for example, word processor data and simultaneously outputs to display 50. Display 50 is a CRT and indicates the characters/letters recognized by data processing system 40 on the display.

The neural network of data processing system 30 is constructed as a part of the hardware of a computer. Data processing system 30 is expressed in FIG. 1 as a model. It comprises input layer 31, middle layer 32, and output layer 33. Middle layer 32 is arranged between input layer 31 and output layer 33. In the present embodiment, each layer 31, 32, and 33 comprises the same number of neurons N. Each neuron in input layer 31 is connected to each neuron N in middle layer 32, and those neurons in middle layer 32 are each connected to each neuron N in output layer 33.

Figure 3:
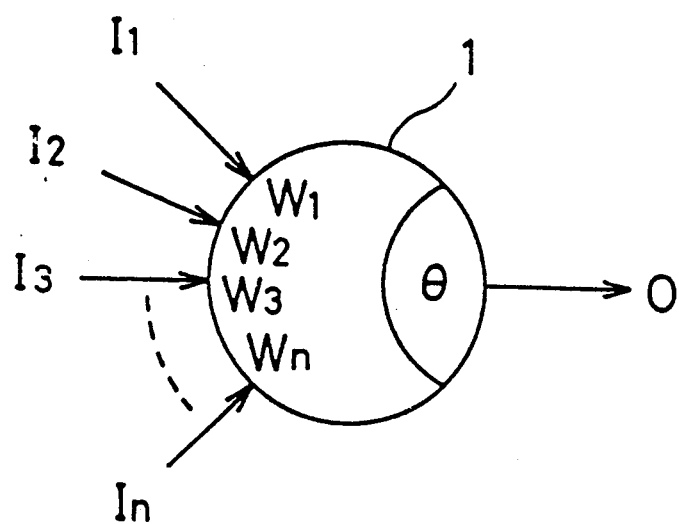
FIG. 3 shows an outline structure of an embodiment of a neuron.

As mentioned above, referring to FIG. 3, each neuron N outputs the data of "1" or "0" according to the normalized function in formula (1). Neuron N is constructed of an operator amplifier, for example. Weight Wn to be multiplied to the data to be inputted to each neuron N is obtained by a changeable resister connected to the input terminal. A threshold function is realized by a switching element. That is, learning is executed by changing output data and by changing weight Wn by changing the changeable resister according to output data of each neuron.

Figure 2:
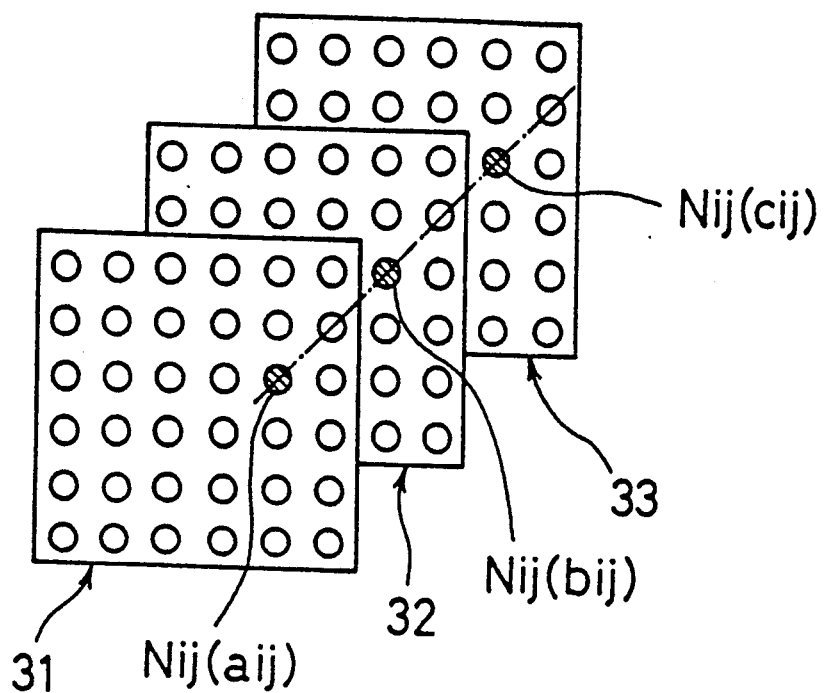
FIG. 2 shows an outline structure of neurons in an input layer, middle layer and output layer.

FIG. 2 shows input layer 31, middle layer 32 and output layer 33 as a model; each layer 31, 32 and 33 comprises the same number of neurons. Here, for a simple explanation, the number of neurons is 36 in each layer 31, 32 and 33. Neurons are arranged as 6 in the lateral direction and 6 in the longitudinal direction in each layer. It is presumed that the point in the left lower corner is the origin, and that the neuron in the location of i-th left and j-th upper is Nij.

Each neuron in input layer 31 is activated by characteristics data obtained through video camera 10. When an activation combination of N11, N12, N21 and N22 expresses the number of edge points, and N13, N14, N23 and N24 expresses the number of branch points, the activation pattern of neurons in input layer 31 is decided artificially according to characters/letters to be inputted.

On the other hand, in output layer 33, a character/letter is expressed by neuron Nii on a diagonal line from the edge on the lower left to the edge of the upper right. That is, the neurons on the diagonal line express the character code of the character/letter, and the activation pattern of neurons in output layer 33 is decided artificially. In the present embodiment, the kind of activation pattern is 64 for neuron Nii on the diagonal line. Therefore, it is possible to recognize 64 kinds of characters/letters; recognition of alphabets is possible, for example.

Before executing learning of character/letter recognition, neurons in output layer 33 do not activate even if character/letter data is inputted to data processing system 30. These neurons can be activated by learning. Its learning is concluded when a certain activation pattern appears according to inputted character/letter data. Input and output patterns for learning are the representative data to be processed in the neural network. The data to be actually processed exists widely. Learning is executed until association for the representative input and output data is performed adequately. When learning is concluded, input layer 31 and output layer 33 show ignition patterns decided arbitrarily according to inputted character/letter data as mentioned above. It is presumed that the activation pattern in each layer of input layer 31, middle layer 32 and output layer 33 changes smoothly in these layers of 31, 32 and 33. In the present embodiment, the weights in middle layer 32 and output layer 33 are changed in order for patterns in these layers to change smoothly in the learning process.

First, it is decided if neuron Nij in middle layer 32 activates or not considering the activation of neurons adjacent to each neuron Nij in input layer 31 and output layer 33 corresponding to the neuron Nij. That is, when neurons activate with more than a certain rate among corresponding neuron Nij and neurons around it in input layer 31 and output layer 33, neuron Nij in middle layer 32 is judged to have the tendency of ignition. Weights of designated neurons in middle layer 32 and output layer 33 are increased in order to obtain such activation.

Figure 5A:
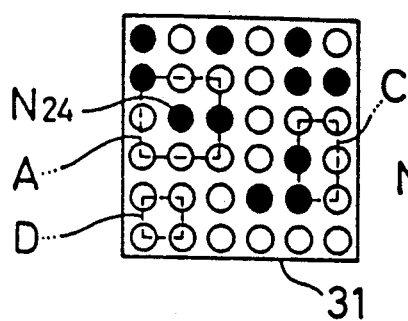
FIGS. 5(a), 5(b) and 5(c) show activation patterns of each layer when neurons in a middle layer have the tendency of activation in the case that the activation rate of neurons in a corresponding area is more than 15%.
Figure 5B:
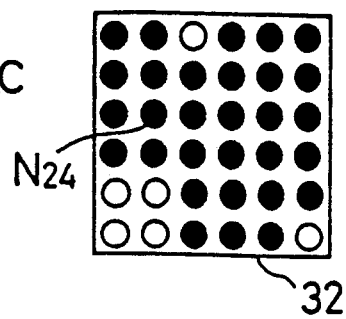
Figure 5C:
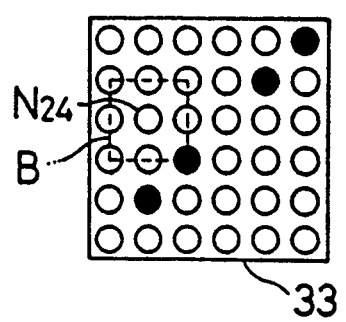

The judging method if neurons in the middle layer are to activate or not is described referring to FIG. 5(a), (b) and (c). FIG. 5 (a) shows the activation pattern in input layer 31, FIG. 5(b) shows that in middle layer 32, FIG. 5 (c) shows that in output layer 33. In these figures, black circles show activated neurons, white circles show non-activated neurons. In this embodiment, input layer 31 shows the activation pattern as in the diagram according to characteristics data of an inputted character/letter. The ignition activation pattern in output layer 33 has to be what is shown in the diagram so as to recognize it. That is, the activation pattern in input layer 31 in the diagram is fixed according to input character/letter. The ignition activation pattern in output layer 33 is what is determined on the completion of learning. The activation pattern in middle layer 32 is the one expected by the method of the present embodiment.

In FIG. 5 (a), (b) and (c), first the activation condition of, for instance, neuron N24 and 8 neurons adjacent to it in input layer 31 is examined, corresponding to neuron N24 in middle layer 32. That is, examining the activation condition of neurons in the area surrounded by broken line A, 3 neurons activate in it. In the same way, examining the activation distribution of neuron N24 in output layer 33 corresponding to N24 in middle layer 32 and neurons adjacent to it—that is, in the area surrounded by broken line B—1 neuron activates. Therefore, 4 neurons activate among 18 neurons in input layer 31 and output layer 33 corresponding to neuron N24 in middle layer 32 and adjacent neurons to it. Neuron N24 in middle layer 32 is judged to have the tendency of activation when it is decided that the neuron in middle layer 32 is to activate in such a case of more than or equal to 15% of neurons activating among the neurons in areas A and B. As for FIG. 5 (a), (b) and (c), it is decided that a neuron in middle layer 32 has the tendency of activation when more than or equal to 15% of neurons are activated among the neurons in input layer 31 and output layer 33 corresponding to the neuron in middle layer 32.

Concerning the neurons on the edge, the activation condition of 6 neurons shown with broken line C is examined. Concerning the neurons on the corner, that of 4 neurons shown with broken line D is examined.

In FIG. 5 (a), (b) and (c), 30 black neurons are judged to have the tendency of activation among the neurons in middle layer 32. On the character/letter recognition learning, only certain values are increased in order for the weight of each neuron in middle layer 32 and output layer 33 to obtain the activation pattern obtained in this way.

Figure 4:
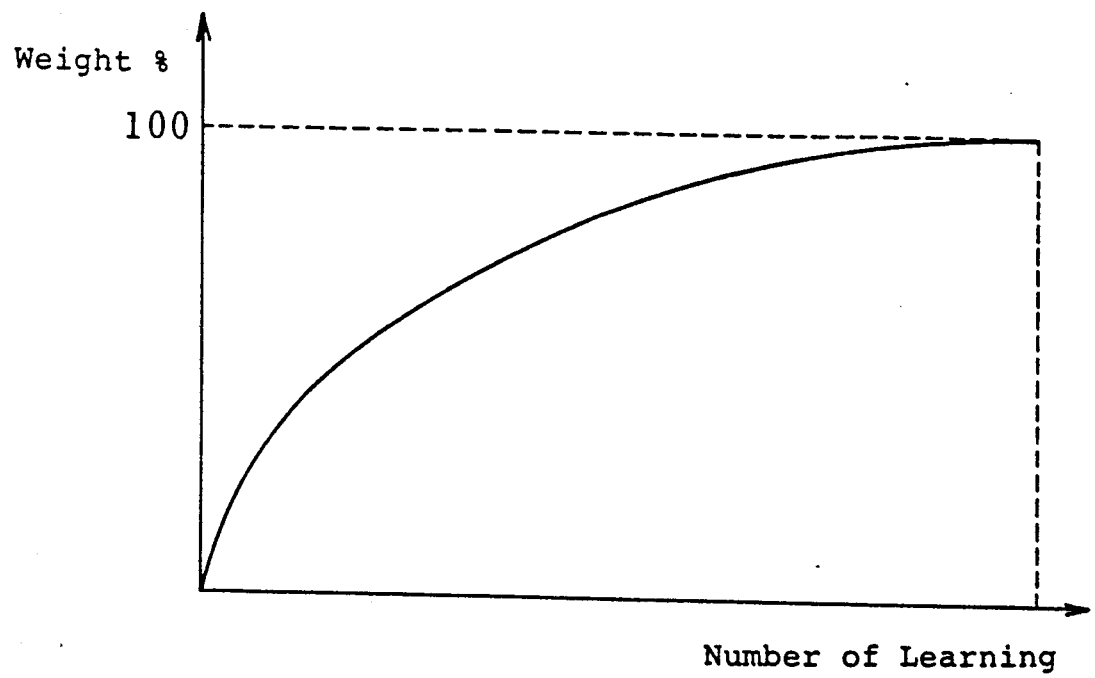
FIG. 4 shows a diagram of the relationship between the number of learning and weight.

Explaining the increase of weight using FIG. 4, when output data 0 of neuron 1 in the middle layer is the same value on activation (for instance "1"), the weight of synapse ("W2" and "W3" in this case) corresponding to the data inputted from an activated neuron (for instance "I2" and "I3") is, for example, increased 5% among the neurons in the input layer connected to neuron 1. The synapse weight of a neuron in the output layer is processed in the same way. As described above, the weight of synapse corresponding to the neuron in the middle layer decided to be activated is increased 5%, for example.

The weight of middle layer 32 and output layer 33 is increased in order for an activation pattern to be changed smoothly among each layer of input layer 31, middle layer 32 and output layer 33. Here it is decided that each neuron in input layer 31 and output layer 33 is to activate on the same frequency as much as possible for all input characters/letters. It is, therefore, possible for each neuron in middle layer 32 to ignite evenly. It is also possible to prevent the convergence at a local minimum, by neuron in middle layer 32 activating in even approximation. It is, therefore, possible to avoid the generation of neurons with no activation and to operate neurons in middle layer 32 efficiently.

The increase of synapse weight on one learning changes as in FIG. 4 according to the number of learnings. The learning of a whole system is executed gradually by many learnings, and simultaneously, fine adjustment is carried out for fine changes. The learning speed is developed by rapid increase of weight in the beginning.

In the embodiment above, middle layer 32 is connected to input layer 31 and output layer 33, that is, there are three layers. However, the present invention does not set limits on embodiments as 3 layers of neural networks. It is possible to apply it to neural networks with 4 or more layers. In this case, selecting the first middle layer before everything, the weight of synapse in the first middle layer and output layer is increased in order that each neuron in the middle layer has the tendency of activation when the neurons in the input layer and output layer corresponding to each other and neurons adjacent to them activate with more than a certain rate. When learning is concluded so far as a certain step concerning all the input characters/letters, adding the new second middle layer, the weight of synapse is increased in the second middle layer and the layer connected to the output side of it (output layer or the first middle layer), considering whether or not corresponding neurons and ones adjacent to it activate with more than a certain rate, in the same way as the second middle layer. Consequently, weight distribution in the case with 4 layers can be obtained. As to the case with 5 or more layers, the same process is performed.

Figure 6A:
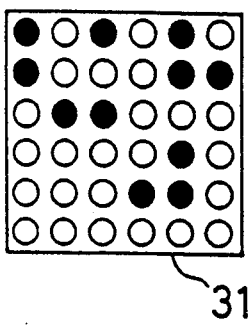
FIGS. 6(a), 6(b) and 6(c) shows activation patterns of each layer when neurons in a middle layer have the tendency of activation in the case that the activation rate of neurons in a corresponding area is more than 20%.
Figure 6B:
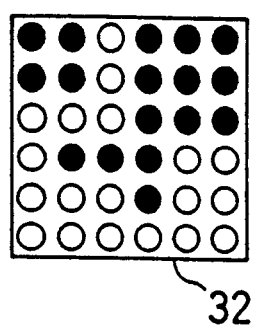
Figure 6C:
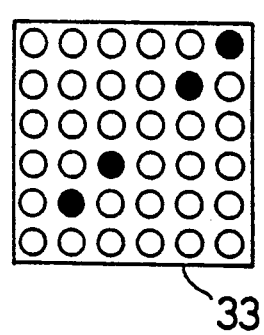

FIGS. 6 (a), (b) and (c) show activation patterns in layers 31, 32 and 33 on recognizing the same character/letter as in FIGS. 5 (a) to (c). FIGS. 6 (a) and (c) are quite the same as FIGS. 5 (a) and (c). The activation pattern in middle layer 32 is decided to have the tendency of activation when the neurons corresponding to those in input layer 31, output layer 33 and adjacent to them activate more than 20%, different from FIG. 5 (b).

Figure 7A:
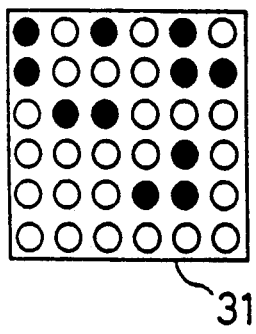
FIGS. 7(a), 7(b) and 7(c) show activation patterns of each layer when neurons in a middle layer have the tendency of activation in the case that the activation rate of neurons in a corresponding area is more than 25.
Figure 7B:
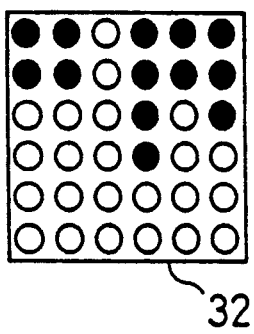
Figure 7C:
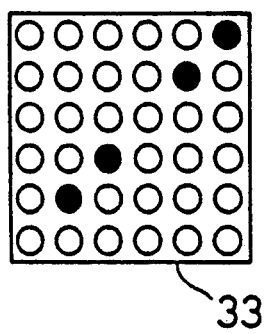

FIGS. 7 (a), (b) and (c) also show activation patterns in each layer on recognizing (c). FIGS. 6 (a) and (c) are quite the same as FIGS. 5 (a) and (c). In FIGS. 7 (a) to (c), the activation pattern in middle layer 32 is decided to have the tendency of activation when neurons corresponding to those in input layer 31, output layer 33 and adjacent to them activate more than 25%.

As is easily understood from the comparison with FIG. 5 (b), FIG. 6 (b) and FIG. 7 (b), the activation pattern in middle layer 32 has the characteristic of activation pattern in both the input layer and output layer. The higher the activation rate of neurons in the area corresponding to input layer 31 and output layer 33, the less the number of neurons to be activated in middle layer 32.

Figure 8A:
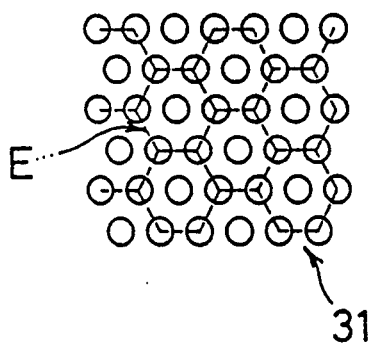
FIGS. 8(a), 8(b) and 8(c) show the neurons in an input layer, middle layer and output layer in the case that the arrangement of neurons can be divided into a honeycomb state.
Figure 8B:
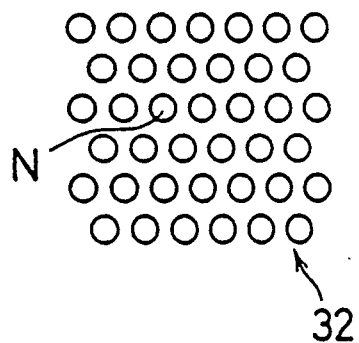
Figure 8C:
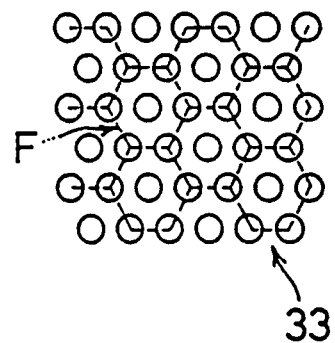

Though the areas A, B, C and D to decide neurons adjacent to each neuron are rectangles in the embodiments above, the form of an area is not limited. When the arrangement of neurons can be divided in the state of honeycomb, the form of the area is a hexagon as shown in FIGS. 8 (a), (b) and (c). In this case, area E in input layer 31 and area F in output layer corresponding to neuron N in middle layer 32 are comprised of 7 neurons. Neuron N in middle layer 32 has the tendency of activation when 14 neurons in area E and F activate with more than a certain rate.

The input and output data for a neuron is not limited to a binary value. It may be a multivalue and analog data when the data is digital. An output layer may be constructed to define a character/letter for recognition by all neurons. It is not necessary to be constructed to express character codes by neurons on a diagonal line. The number of neurons in the layers of 31, 32 and 33 is not set a limit to 36. It is possible to set it according to the number of kinds of characters/letters to be recognized.

The present invention can be applied to not only character/letter recognition but also pattern recognition and voice recognition. As mentioned above, it is possible to execute effective learning on the middle layer of a neural network by the present invention.

What is claimed is:

1. A learning method for transforming an untrained network to a trained network, said network comprising an input layer, a middle layer and an output layer, each said layer including a plurality of neurons, each said neuron being a signal processing element, said middle layer being arranged between said input and output layers wherein each neuron in said middle layer is connected to each neuron in said input and output layers, said method comprising the steps of:

determining an activation pattern of said neurons in said input layer;
  determining an activation pattern of said neurons in said output layer;
  defining a neighborhood of said neurons in said input and output layers corresponding to a neuron in said middle layer;
  determining a rate of activation in said neighborhood of neurons, said rate being the total number of neurons activating in said neighborhood in said input and output layers divided by the total number of neurons in said neighborhood in said input and output layers;
  comparing said rate to a threshold value;
  determining that said neuron in said middle layer has a tendency to activate when said rate is greater than said threshold value;
  increasing the value of weights applied to all neurons in said input layer which are connected to said neuron in said middle layer and weights applied to all neurons in said output layer which are connected to said neuron in said middle layer, in order to increase the likelihood of activation of said neuron in said middle layer; and
  repeating the above steps for each said neuron in said middle layer, thereby generating a desired activation pattern of neurons in said middle layer corresponding to said trained network.

2. The learning method of claim 1 comprising the steps of:

a. increasing the value of said threshold so that less neurons in said middle layer have a tendency to activate;
b. comparing said rate in said neighborhood of neurons to said increased threshold value;
c. determining that said neuron in said middle layer has a tendency to activate when said rate is greater than said increased threshold value;
d. increasing the value of weights applied to all neurons in said input layer which are connected to said neurons in said middle layer and weights applied to all neurons in said output layer when are connected to said neuron in said middle layer, in order to increase the likelihood of activation of said neuron in said middle layer; and
e. repeating steps b.-d. for each neuron in said middle layer, thereby generating a desired activation pattern of neurons in said middle layer corresponding to said trained network.

3. The learning method of claim 2 further including the steps of:
a. adding an additional middle layer between said input layer and said middle layer or between said middle layer and said output layer, said additional middle layer having a plurality of neurons;
b. connecting each neuron in said additional middle layer to each neuron in the two layers adjacent to said additional middle layer;
c. defining a neighborhood of neurons in said adjacent layers corresponding to a neuron in said additional middle layer;
d. determining a rate of activation in said neighborhood of neurons, said rate being the total number of neurons activating in said neighborhood divided by the total number of neurons in said neighborhood;
e. comparing said rate to a threshold value;
f. increasing the value of weights applied to all neurons in one of said adjacent layers which are connected to said neuron in said additional middle layer and weights applied to all neurons in said other adjacent layer which are connected to said neuron in said additional middle layer, in order to increase the likelihood of activation of said neuron in said additional middle layer; and
d. repeating steps c.-f. for each neuron in said additional middle layer, thereby generating a desired activation pattern of neurons in said additional middle layer corresponding to said trained network.

4. The learning method of claim 3 further comprising the steps of:
a. increasing the value of said threshold so that less neurons in said additional middle layer have a tendency to activate;
b. comparing said rate in said neighborhood of neurons to said increased threshold value;
c. determining that said neuron in said additional middle layer has a tendency to activate when said rate is greater than said increased threshold value;
d. increasing the value of weights applied to all neurons in one of said adjacent layers which are connected to said neuron in said additional middle layer and weights applied to all neurons in said other adjacent layer which are connected to said neuron in said additional middle layer, in order to increase the likelihood of activation of said neuron in said additional middle layer; and
e. repeating steps b.-d. for each neuron in said additional middle layer, thereby generating a desired activation pattern of neurons in said additional middle layer corresponding to said trained network.

5. The learning method of claim 1 wherein said neighborhood includes a neuron in said input layer and a neuron in said output layer corresponding to the same position as said neuron in said middle layer and all neurons adjacent to said neuron in said input layer and said output layer.

6. The learning method of claim 1, wherein said learning method is a method for recognizing characters, said activation pattern in said input layer corresponds to characteristics data of an image, and said activation pattern in said output layer corresponds to character data of said image.

* * * * *